United States Patent
Raabe et al.

(10) Patent No.: US 11,683,099 B1
(45) Date of Patent: Jun. 20, 2023

(54) GIGABIT MULTIMODE BIDIRECTIONAL OPTICAL MODULE

(71) Applicant: Cisco Technology, Inc., San Jose, CA (US)

(72) Inventors: Christian Rainer Raabe, Nuremberg (DE); Theodor Kupfer, Feucht (DE)

(73) Assignee: CISCO TECHNOLOGY, INC., San Jose, CA (US)

( * ) Notice: Subject to any disclaimer, the term of this patent is extended or adjusted under 35 U.S.C. 154(b) by 83 days.

(21) Appl. No.: 17/484,187

(22) Filed: Sep. 24, 2021

(51) Int. Cl.
*H04B 10/50* (2013.01)
*H04B 10/572* (2013.01)
*H04B 10/25* (2013.01)

(52) U.S. Cl.
CPC ......... *H04B 10/5053* (2013.01); *H04B 10/25* (2013.01); *H04B 10/506* (2013.01); *H04B 10/572* (2013.01)

(58) Field of Classification Search
None
See application file for complete search history.

(56) References Cited

U.S. PATENT DOCUMENTS

| 8,514,966 | B2 * | 8/2013 | Wajcer | H04L 25/03834 |
| | | | | 342/358 |
| 2004/0161240 | A1 * | 8/2004 | Weber | G11B 5/00 |
| | | | | 398/139 |
| 2006/0062576 | A1 * | 3/2006 | Nakamura | H04J 14/0227 |
| | | | | 398/72 |
| 2007/0286605 | A1 | 12/2007 | Feuer et al. | |
| 2011/0305454 | A1 | 12/2011 | Hsieh | |
| 2012/0106964 | A1 * | 5/2012 | Sniezko | H04B 10/25751 |
| | | | | 398/67 |

(Continued)

FOREIGN PATENT DOCUMENTS

CN 210839596 U 6/2020

OTHER PUBLICATIONS

FluxLight, "QSFP-40/100G-SRBD-FL Cisco Compatible (40/100GBase-SR-BD) Optical Transceiver", 4 pages, retrieved from Internet Sep. 24, 2021.

(Continued)

*Primary Examiner* — David W Lambert
(74) *Attorney, Agent, or Firm* — Edell, Shapiro & Finnan, LLC

(57) ABSTRACT

At a controller of an optical module including optical transmitters and optical receivers coupled to the controller and coupled to first and second optical fibers: responsive to a first command, first configuring the optical module to operate in a normal mode in which the optical module operates at a maximum communication capacity by transmitting and receiving a maximum number of wavelengths, that the optical module is capable of transmitting and receiving, on each of the first optical fiber and the second optical fiber; and responsive to a second command, second configuring the optical module to operate in a backward compatible legacy mode in which the optical module operates at a reduced communication capacity compatible with a legacy optical module by transmitting and receiving a reduced number of wavelengths, that is less than the maximum number of wavelengths, on each of the first optical fiber and the second optical fiber.

20 Claims, 6 Drawing Sheets

(56) References Cited

U.S. PATENT DOCUMENTS

2015/0172071 A1* 6/2015 Rakib ............... H04N 21/2383
                                                    725/111
2019/0140761 A1   5/2019 Chan et al.
2019/0215586 A1   7/2019 Swinkels et al.

OTHER PUBLICATIONS

David Lewis et al., "100G SWDM4 MSA Technical Specifications", SWDM MSA Technical Specifications Rev 1.0.1, Nov. 6, 2017, 15 pages.
David Lewis et al., "40G SWDM4 MSA Technical Specifications", 40G-SWDM4 MSA Technical Specifications Rev 1.0.1, Nov. 6, 2017, 14 pages.

* cited by examiner

500

502
Responsive to a first command, first configure an optical module to operate in a normal mode in which the optical module operates at a maximum communication capacity on each of a first optical fiber and a second optical fiber 504
Responsive to a second command, second configure the optical module to operate in a backward compatible legacy mode in which the optical module operates at a reduced communication capacity compatible with a legacy optical module

FIG.5

GIGABIT MULTIMODE BIDIRECTIONAL OPTICAL MODULE

TECHNICAL FIELD

The present disclosure relates to optical modules in an optical network.

BACKGROUND

A first conventional bidirectional (bidi) optical module (referred to as a "legacy" optical module) connects to two optical fibers, and transports one modulated optical signal or wavelength per fiber and direction. The wavelengths are modulated to convey symbols at a low baud rate. A second conventional bidi optical module can transmit and receive wavelengths on one of the optical fibers, and transmit and receive wavelengths on the other one of the optical fibers, to achieve full-duplex communication. The second conventional bidi optical module may modulate the wavelengths at a high baud rate that is higher than the low baud rate. When deployed in an optical network, the legacy optical module and the second conventional bidi optical module are incompatible, and cannot intercommunicate, because they transmit and receive different numbers of wavelengths at different baud rates. Such incompatibility complicates deployment of the two different types of conventional bidi optical modules (i.e., the legacy optical module and the second conventional bidi optical module) in the optical network.

BRIEF DESCRIPTION OF THE DRAWINGS

FIG. 5 is a flowchart of a method of selectively configuring the optical module to operate in the normal mode or the legacy mode, according to an example embodiment.

DESCRIPTION OF EXAMPLE EMBODIMENTS

Overview

In an embodiment, a controller of an optical module, including optical transmitters and optical receivers coupled to the controller and coupled to a first optical fiber and a second optical fiber, performs a method. The method includes, responsive to a first command, first configuring the optical module to operate in a normal mode in which the optical module operates at a maximum communication capacity by transmitting and receiving a maximum number of wavelengths that the optical module is capable of transmitting and receiving on the first optical fiber and the second optical fiber. The method also includes, responsive to a second command, second configuring the optical module to operate in a backward compatible legacy mode in which the optical module operates at a reduced communication capacity compatible with a legacy optical module by transmitting and receiving a reduced number of wavelengths, that is less than the maximum number of wavelengths, on the first optical fiber and the second optical fiber.

Example Embodiments

Figure 1:
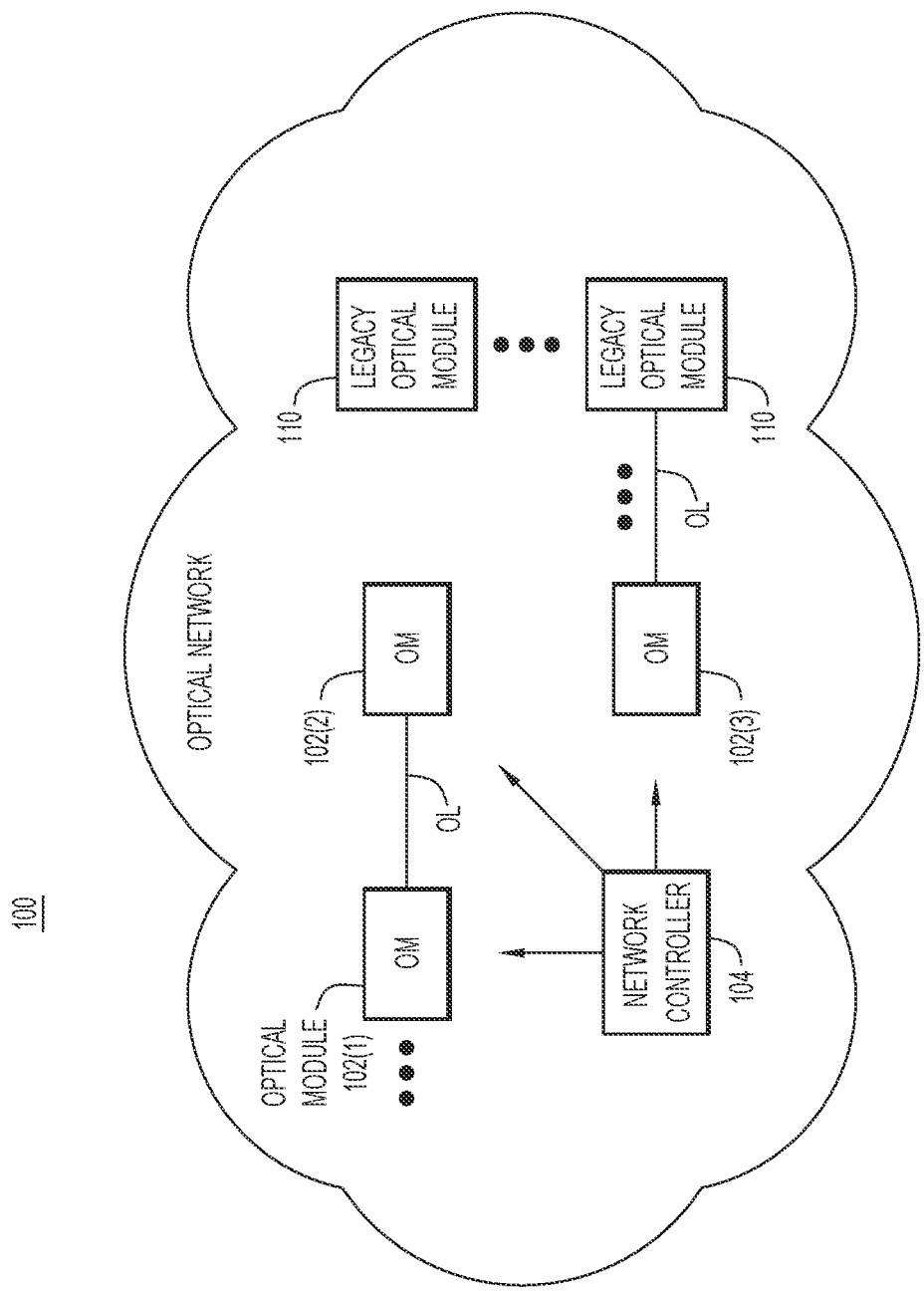
FIG. 1 is a block diagram of an optical network in which a programmable optical module combines wavelength division multiplexing (WDM) and bidirectional (i.e., full-duplex) techniques to increase optical communication capacity, while maintaining backward compatibility to a legacy optical module, according to an example embodiment.

With reference to FIG. 1, there is a block diagram of an example optical network 100 in which a programmable optical module (OM) combines wavelength division multiplexing (WDM) and bidirectional techniques to increase optical communication capacity, while maintaining backward compatibility to a less capable legacy optical module. To achieve backward compatibility, the optical module (i) switches ON only a subset of a total or maximum number of possible wavelengths available to the optical module (i.e., that the optical module is capable of transmitting and receiving), to match a reduced number of wavelengths used by the legacy optical module, and (ii) reduces a baud rate of each wavelength (that remains ON) from a maximum possible baud rate to a reduced baud rate used by the legacy optical module.

Optical network 100 includes a network of programmable optical modules 102(1), 102(2) and 102(3) (collectively referred to as "optical modules 102") and a network controller 104 configured to communicate with each optical module. Optical modules 102 are configured according to the embodiments presented herein to communicate with each other at their full communication capacity, and to also communicate at a reduced communication capacity with one or more legacy optical modules 110 in optical network 100, as will be described below. Optical modules 102 transmit optical signals to, and receive optical signals from, each other (and legacy optical modules 110) in an optical data/forwarding plane of the optical network. Thus, optical modules 102 may each be referred to as an "optical transmitter/receiver (transceiver)." Optical modules 102 may be employed on line cards of network device racks, for example. Network controller 104 communicates with and controls optical modules 102 in a control plane of optical network 100. Network controller 104 may communicate with optical modules 102 using a known or hereafter developed communication protocol. For example, via the control plane, network controller 104 provisions and controls the optical modules for operation in the data plane. Network controller 104 may perform provisioning operations under control of an administrative entity connected to optical network 100, not shown. While only three optical modules are shown in FIG. 1, it is understood that an optical network typically includes a much larger number of such optical modules.

Figure 3:
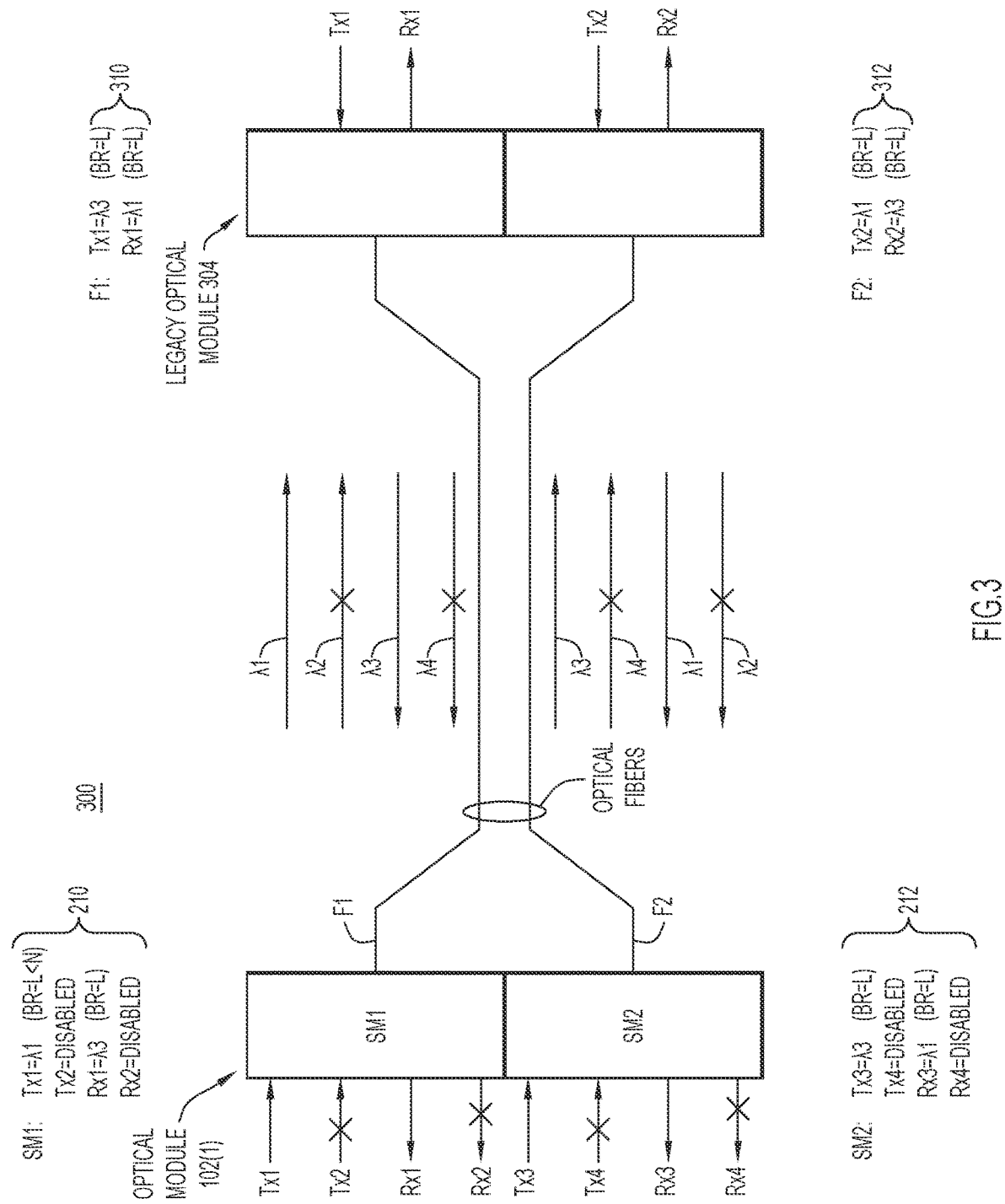
FIG. 3 is a high-level block diagram of a "legacy" arrangement in which an optical module from the optical network operates in a legacy mode to achieve backward compatibility with the legacy optical module, according to an example embodiment.

Optical modules 102 are each bidirectional (bidi) wavelength division multiplexing (WDM) optical modules that transmit and receive WDM optical signals (including superdense (SD) WDM (SDWDM) optical signals) over optical fibers. Typically, optical network 100 includes optical links (OLs) or spans that interconnect pairs of optical modules 102. Therefore, optical network 100 includes a number of 1-1 interconnects between pairs of optical modules, as shown in FIG. 3. Optical links OL may each comprise multiple distinct optical fibers that carry the optical signals between corresponding pairs of optical modules 102 coupled to the optical fibers.

According to embodiments presented herein, each optical module 102(1)-102(3) is configured to be selectively controlled responsive to mode commands issued by network controller 104 to operate in a either (i) a "normal" mode in which the optical module operates at a "normal" communication capacity (which may be considered a maximum communication capacity at which the optical module can operate), or (ii) a "legacy" mode in which the optical module operates at a reduced communication capacity (i.e. a legacy communication capacity) relative to the maximum communication capacity. For example, when an optical module is interconnected with another such optical module (e.g., optical module 102(1) is interconnected to optical module 102(2)), network controller 104 may issue to optical module 102(1) and optical module 102(2) a first command (i.e., a normal mode command) configured to cause/compel the respective optical modules 102(1) and 102(2) to operate in the normal mode. Upon receiving the normal mode command, each of optical module modules 102(1) and 102(2) configures itself to operate in the normal mode.

Conversely, when one of the optical modules 102(1)-102(3) is interconnected with a legacy optical module (e.g., one of legacy optical modules 110) that is only capable of operating at the reduce communication capacity, network controller 104 may issue to the optical module 102(1), 102(2) or 102(3) a second command (i.e., a legacy mode command) configured to cause/compel the optical module 102(1), 102(2) or 102(3) to operate in the legacy mode, so as to be backward compatible with the legacy optical module. Upon receiving the legacy command, optical module 102(1), 102(2) or 102(3) configures itself to operate in the legacy mode so as to be backward compatible with the legacy optical module. Examples of the foregoing are described below.

Figure 2:
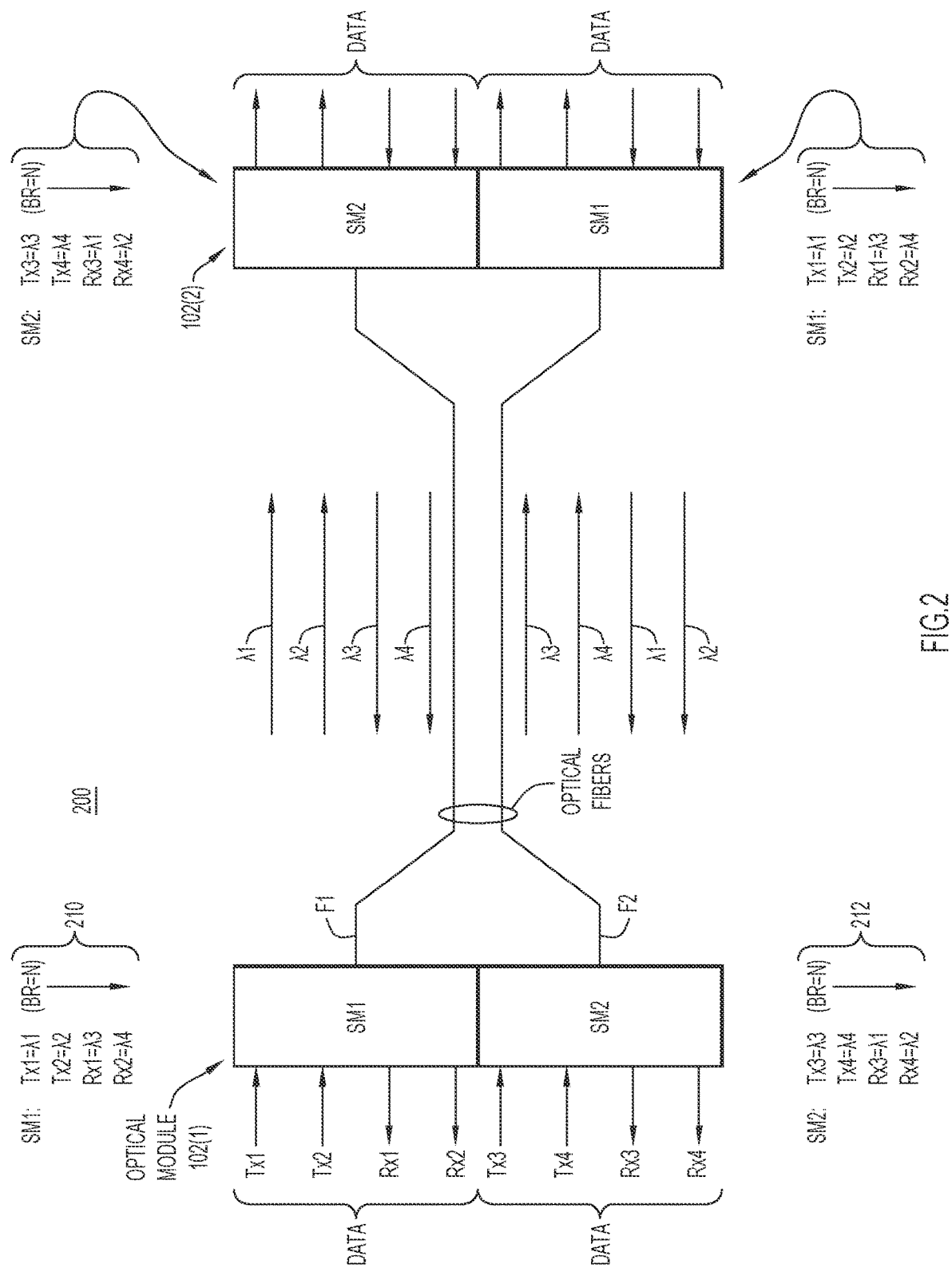
FIG. 2 is a high-level block diagram of a "normal" arrangement in which a pair of optical modules of the optical network are each configured to operate in a normal mode, according to an example embodiment.

With reference to FIG. 2, there is a high-level block diagram of an example "normal" arrangement 200 in which a pair of optical modules 102(1) and 102(2) are each configured to operate in the normal mode. In the example of FIG. 2, optical module 102(1) and 102(2) are configured similarly. Accordingly, the following description of optical module 102(1) shall suffice for optical module 102(2), except that the transmit and receive directions described in connection with optical module 102(1) are reversed for optical module 102(2).

Optical module 102(1) includes a first submodule SM1 coupled to a first optical fiber F1 and a second submodule SM2 coupled to a second optical fiber F2. First and second submodules SM1, SM2 serve as programmable bidi WDM sub-modules of optical module 102(1). Submodule SM1 receives channels of data (e.g., binary/digital data in electrical form) TX1, TX2 in a transmit direction (i.e., from left-to-right in FIG. 2), converts them to modulated optical signals (referred to simply as "optical signals") at corresponding wavelengths λ1, λ2 that each convey the digital data at a "normal" baud rate (BR) N (i.e., symbol rate N), and transmits the optical signals on optical fiber F1. In an example, the normal baud rate N may be 50 Baud, which corresponds to 100 Gbps, when each optical symbol conveys 2-bits of data. In the ensuing description, the terms "optical signal" and "wavelength" are used interchangeably.

In a receive direction (i.e., from right-to-left in FIG. 2), submodule SM1 receives, from optical fiber F1, wavelengths λ3, λ4 modulated with data RX1, RX2 at the normal baud rate N, recovers the data in the electrical form from the wavelengths, and forwards the data to next processing stages (not shown). A summary mapping or assignment of data channels TX1, TX2, RX1, and RX2 to wavelengths λ1, λ2, λ3, and λ4, respectively, and to the baud rate (BR), for submodule SM1/optical fiber F1, is indicated at 210 in FIG. 2.

Similarly, submodule SM2 receives channels of data TX3, TX4 in the transmit direction, converts them to wavelengths λ3, λ4 that each convey the data at the normal baud rate N, and transmits the wavelengths on optical fiber F2. In the receive direction, submodule SM2 receives, from optical fiber F2, wavelengths λ1, λ2 modulated with data RX3, RX4 at the normal baud rate N, recovers the data from the wavelengths, and forwards the recovered data to next processing stages. A summary mapping or assignment of data channels TX3, TX4, RX3, and RX4 to wavelengths λ3, λ4, λ1, and λ2, respectively, for submodule SM2/optical fiber F2 is indicated at 212 in FIG. 2. In data channel-to-wavelength assignments 210, 212, the baud rate (BR) is indicated as the normal baud rate N, which may be a configured maximum baud rate at which submodules SM1, SM2 can operate, i.e., the maximum symbol rate conveyed by each of the wavelengths.

In summary, when optical module 102(1) operates in the normal mode:
  a. Submodule SM1 is configured to:
    i. Transmit wavelengths λ1, λ2 on optical fiber F1.
    ii. Receive wavelengths λ3, λ4 on optical fiber F1.
  b. Submodule SM2 is configured to:
    i. Transmit wavelengths λ3, λ4 on optical fiber F2.
    ii. Receive wavelengths λ1, λ2 on optical fiber F2.

Thus, with respect to optical module 102(1), (i) wavelengths λ1, λ2 are used in the transmit direction on optical fiber F1, but are used in the receive direction on optical fiber F2, and (ii) wavelengths λ3, λ4 are used in the receive direction on optical fiber F1, but are used in the transmit direction on optical fiber F2.

In an example wavelength allocation scheme, wavelengths λ2, λ3 are each less than 900 nanometers (nm), while wavelengths λ1, λ4 are each greater than 900 nm. A specific wavelength allocation may assign the following specific wavelengths:
  a. Wavelength κ1=910 nm.
  b. Wavelength λ2=880 nm
  c. Wavelength λ3=850 nm.
  d. Wavelength λ4=940 nm.

In addition, assuming an example normal baud rate N=50 Gbaud per wavelength, each of optical fibers F1, F2 (and each of corresponding submodules SM1, SM2) operates at a total of 100 Gigabits per second (Gbps)×4=400 Gbps for the 4 wavelengths per optical fiber. It is understood that the normal baud rate N may be higher or lower than 50 Gbaud.

With reference to FIG. 3, there is a high-level block diagram of an example "legacy" arrangement 300 in which optical module 102(1) is connected to a legacy optical module 304 (which represents one of legacy optical modules 110 from FIG. 1) instead of optical module 102(2). In this arrangement, optical module 102(1) operates in the legacy mode to communicate with legacy optical module 304, i.e., when optical module 102(1) has been configured to operate in the legacy mode. Optical module 102(1) operates in the legacy mode to achieve backward/legacy compatibility with legacy optical module 304. In the example of FIG. 3, optical module 102(1) is coupled to optical fibers F1, F2 as described above, and legacy optical module 304 is also coupled to optical fibers F1, F2, as shown. Legacy optical module 304 can only transmit a single wavelength (e.g., λ3)

and receive a single wavelength (e.g., λ1) on optical fiber F1, and can only transmit a single wavelength (e.g., λ1) and receive a single wavelength (e.g., λ3) on optical fiber F2. In addition, legacy optical module 304 can only operate at a "legacy" baud rate L, which is less than the normal baud rate N (i.e., L<N). For example, the legacy baud rate L may be 25 Gbaud (e.g., 50 Gbps for 2-bits per symbol), for example.

To support backward compatibility to legacy optical module 304, optical module 102(1) offers possible wavelength configurations of which the legacy optical module wavelength configuration described above is a subset. That is, the legacy optical module wavelength configuration is a subset of the possible (programmable) wavelength configurations offered by optical module 102(1). Specifically, backward compatibility is achieved by switching OFF two additional wavelengths offered in optical module 102(1) that are not present in legacy optical module 304, as described below.

When optical module 102(1) operates in the legacy mode:
 a. Submodule SM1 is configured to:
  i. Only transmit wavelength λ1, and not λ2, on optical fiber F1 (i.e., turn OFF or deactivate/disable λ2, as indicated by the "X" in FIG. 3).
  ii. Only receive wavelength λ3, and not λ4, on optical fiber F1 (i.e., turn OFF λ4).
 b. Submodule SM2 is configured to:
  i. Only transmit wavelength λ3, and not λ4, on optical fiber F2.
  ii. Only receive wavelength λ1, and not λ2, on optical fiber F2.

Optical module 102(1) also reduces its baud rate from the normal baud rate N down to the reduced legacy baud rate L (i.e., L<N) to achieve full backward compatibility. That is, all transmitted and received wavelengths are modulated at the legacy baud rate L rather than the normal baud rate N. When operating in the legacy mode, data channel-to-wavelength assignments 210, 212 remain the same, except that certain wavelengths remain activated/turned ON, while others are deactivated/turned OFF, as indicated above. Data channel-to-wavelength assignments for legacy optical module 304/optical fibers F1, F2 are indicated at 310, 312.

Figure 4:
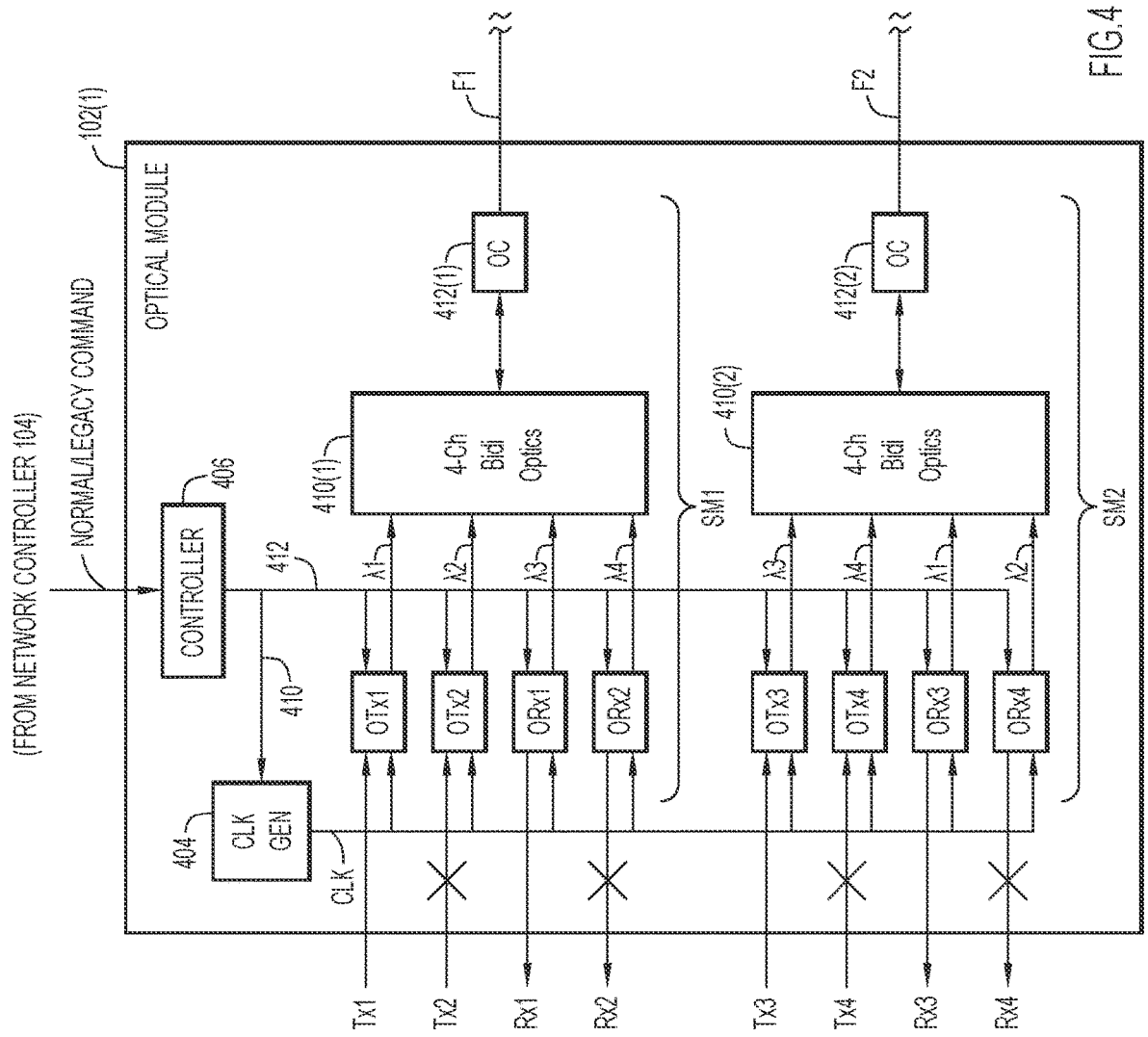
FIG. 4 is a detailed block diagram of the optical module, according to an example embodiment.

With reference to FIG. 4, there is a detailed block diagram of optical module 102(1), according to an embodiment. FIG. 4 may be representative of each of the optical modules 102. Optical module 102(1) includes programmable components, including submodules SM1 and SM2, a clock generator (GEN) 404 to generate a clock signal CLK, and a controller 406 coupled to the submodules and the clock generator, and configured to control the optical module. Submodule SM1 includes optical transmitters OTX1, OTX2, optical receivers ORX1, ORX2, four-channel (Ch) bidi optics 410(1) (referred to simply as "bidi optics" 410(1)) coupled to optical outputs of the optical transmitters and to optical inputs of the optical receivers, and an optical connector (OC) 412(1) coupled to the bidi optics and optical fiber F1. Bidi optics 410(1) includes wavelength selective filters and the like to separate and direct optical signals to appropriate destinations. For example, bidi optics 410(1) transfers optical signals (i.e., wavelengths) from the optical outputs of optical transmitters OTX1, OTX2 to optical fiber F1, and from the optical fiber to the optical inputs of optical receivers ORX1, ORX2. Similarly, submodule SM2 includes optical transmitters OTX3, OTX4, optical receives ORX3, ORX4, four-channel bidi optics 410(2) (also referred to as "bidi optics" 410(2)) coupled to the outputs of the optical transmitters and the inputs of the optical receivers, and an optical connector 412(2) coupled to the bidi optics and optical fiber F2.

Each optical transmitter OTX (e.g., OTX1) may be implemented as an optical modulator (e.g., an integrated optoelectronic modulator), such as a direct modulated vertical cavity surface emitting laser (VCSEL). The optical transmitter OTX (e.g., OTX1) includes (i) an electrical input to receive data (e.g., data TX1, which can include one or more electrical lanes of data), (ii) a clock input to receive clock signal CLK, and (iii) an activate/deactivate control input to receive an activate/deactivate control signal configured to turn ON or turn OFF the optical transmitter depending on a state of the control signal. When activated, the optical transmitter OTX modulates a wavelength at which the optical transmitter operates (e.g., λ1) with the (electrical) data, to produce a modulated wavelength to be transmitted over an optical fiber (e.g., optical fiber F1). The modulated wavelength conveys the data at a baud rate (e.g., baud rate N or baud rate L, depending on the normal or legacy mode in which optical module 102(1) is configured to operate) that is based on the frequency of clock signal CLK and a data rate of the data.

Each optical receiver ORX (e.g., ORX1) may be implemented as an integrated optoelectronic demodulator/detector, which includes a photodetector. The optical receiver ORX (e.g., ORX1) includes (i) an optical input to receive, from an optical fiber (e.g., optical fiber F1), a wavelength that is modulated to convey data, (ii) a clock input to receive clock signal CLK, and (iii) an activate/deactivate control input to receive an activate/deactivate control signal configured to turn ON or turn OFF the optical receiver depending on a state of the control signal. When activated, the optical receiver ORX demodulates the modulated wavelength at the appropriate baud rate based on the frequency of clock signal CLK, to produce/recover the data (e.g., data RX1, which can include one or more electrical lanes of data). That is, optical receiver ORX detects the data from the modulated wavelength.

Controller 406 controls optical module 102(1). Controller 406 generates a frequency control signal 410 and provides it to a frequency control input of clock generator 404. Clock generator 404 generates clock signal CLK with a frequency controlled based on frequency control signal 410, and provides the clock signal to the clock input of each of optical transmitters OTX1-OTX4 and optical receivers ORX1-ORX4. Additionally, controller 406 generates activate/deactivate control signals 412 and provides them to corresponding ones of the activate/deactivate control inputs of corresponding ones of optical transmitters OTX1-OTX4 and optical receivers ORX1-ORX4. Activate/deactivate control signals 412 may be configured to activate (i.e., turn ON) or deactivate (i.e., turn OFF) individual ones of optical transmitters OTX1-OTX4 and optical receivers ORX1-ORX4.

Controller 406 controls optical module 102(1) responsive to external commands from network controller 104, including the first command (i.e., the "normal" command) and the second command (i.e., the "legacy" command), mentioned above. For example, upon receiving the normal command or the legacy command from network controller 104, controller 406 configures optical module 102(1) to operate in the normal mode or in the legacy mode, respectively. Upon receiving the normal command, controller 406 generates/configures frequency control signal 410 and activate/deactivate control signals 412 to cause/compel optical transmitters OTX1-OTX4 and optical modules ORX1-ORX4 (and thus optical module 102(1)) to operate in the normal mode. Specifically, controller 406 configures activate/deactivate control signals 412 to activate/turn ON all of optical transmitters OTX1-OTX4 and all of optical receivers ORX1-

ORX4. This configuration activates/turns ON all of wavelengths λ1-λ4 bi-directionally on each of optical fibers F1, F2, as described above in connection with FIG. 2. In addition, controller 406 configures frequency control signal 410 to drive the frequency of clock signal CLK to a relatively high "normal" frequency value, to cause optical transmitters OTX1-OTX4 and optical receivers ORX1-ORX4 to operate at normal/maximum baud rate N. Thus, optical module 102(1) operates at a maximum communication capacity because it transmits and receives a maximum number of wavelengths that it is capable of transmitting and receiving, on each of optical fibers F1 and F2 (e.g., 4 wavelengths per fiber), and because each wavelength is modulated at the normal/maximum baud rate N.

Upon receiving the legacy command, controller 406 generates/configures frequency control signal 410 and activate/deactivate control signals 412 to cause/compel optical transmitters OTX1-OTX4 and optical receivers ORX1-ORX4 (and thus optical module 102(1)) to operate in the backward compatible legacy mode. Specifically, controller 406 configures activate/deactivate control signals 412 to (i) only turn ON optical transmitters OTX1 and OTX3, and turn OFF optical transmitters OTX2 and OTX4 (indicated by the "X" in-line with each of TX2 and TX4), and (ii) only turn ON optical receivers ORX1 and ORX3, and turn OFF optical receivers ORX2 and ORX4 (indicated by the "X" in-line with each of RX2 and RX4). This configuration reduces the number of wavelengths active on optical fibers F1 and F2 relative to the maximum number of available wavelengths that are used in the normal mode. In addition, controller 406 configures frequency control signal 410 to drive the frequency of clock signal CLK to a relatively low "legacy" frequency value that is less than the relatively high normal frequency value, to cause the reduced number of activated optical transmitters and optical receivers to operate at the reduced legacy baud rate L. Thus, optical module 102(1) operates at a reduced communication capacity compatible with legacy optical module 304 by (i) transmitting and receiving a reduced number of wavelengths, that is less than the maximum number of wavelengths, on each of the optical fibers F1 and F2, and (ii) operating each wavelength at the legacy baud rate.

With reference to FIG. 5, there is a flowchart of an example method 500 of configuring a programmable optical module (e.g., optical module 102(1), 102(2) or 102(3)) including optical transmitters (e.g., OTX1-OTX4) and optical receivers (e.g., ORX1-ORX4) coupled to the controller and a first optical fiber (e.g., F1) and a second optical fiber (e.g., F2), to selectively operate in a normal mode and a legacy mode that is backward compatible with a legacy optical module.

At 502, responsive to a first command (i.e. the normal command), the controller first configures the optical module to operate in the normal mode in which the optical module operates at a maximum communication capacity by transmitting and receiving a maximum number of wavelengths, that the optical module is capable of transmitting and receiving, on each of the first optical fiber and the second optical fiber. The first configuring may include activating all of the optical transmitters and the optical receivers in order to perform transmitting and receiving the maximum number of wavelengths. The transmitting and receiving achieve full-duplex WDM communications. As used herein, "transmitting" is construed broadly to include modulating a wavelength with data (e.g., using an optical transmitter OTX) at a particular baud rate, and transmitting the wavelength as modulated to a corresponding optical fiber. Similarly, "receiving" is construed broadly to include receiving from a corresponding optical fiber a wavelength that is modulated with data at a particular baud rate, and demodulating/detecting the data from the wavelength.

Transmitting and receiving the maximum number of wavelengths may include:
a. Transmitting a first wavelength (e.g., λ1) and a second wavelength (e.g., λ2) on the first optical fiber.
b. Receiving a third wavelength (e.g., λ3) and a fourth wavelength (e.g., λ4) on the first optical fiber.
c. Transmitting the third wavelength (e.g., λ3) and the fourth wavelength (e.g., λ4) on the second optical fiber.
d. Receiving the first wavelength (e.g., λ1) and the second wavelength (e.g., λ2) on the second optical fiber.

The first configuring may further include configuring the optical transmitters and the optical receivers to each operate at a normal baud rate. This may include clocking each of the optical transmitters and receivers at a relatively high (normal) clock frequency to achieve the normal baud rate.

At 504, responsive to a second command (i.e., the legacy command), the controller second configures the optical module to operate in a backward compatible legacy mode in which the optical module operates at a reduced communication capacity compatible with the legacy optical module by transmitting and receiving a reduced number of wavelengths, that is less than the maximum number of wavelengths, on each of the first optical fiber and the second optical fiber. The second configuring may include activating (e.g., turning ON) a first subset, and deactivating a second subset (e.g., turning OFF), of all of the optical transmitters and the optical receivers in order to perform transmitting and receiving the reduced number of wavelengths.

Transmitting and receiving the reduced number of wavelengths may include:
a. Transmitting only the first wavelength on the first optical fiber.
b. Receiving only the third wavelength on the first optical fiber.
c. Transmitting only the third wavelength on the second optical fiber.
d. Receiving only the first wavelength on the second optical fiber.

The second configuring may further include configuring the first subset of the optical transmitters and the optical receivers to operate at a legacy baud rate that is less than the normal baud rate. This may include clocking each of the optical transmitters and receivers at a relatively low (legacy) clock frequency (that is less than the normal clock frequency) to achieve the legacy baud rate.

Another method comprises: at an optical module coupled to a legacy optical module over first and second optical fibers, wherein the optical module includes a maximum number of optical transmitters and receivers that are capable of transmitting and receiving a corresponding (total) maximum number of wavelengths at a maximum baud rate per wavelength on the first and second optical fibers, wherein the legacy optical module is only capable of transmitting and receiving a legacy number of wavelengths that is less than the maximum number of wavelengths on the first and second optical fibers at a legacy baud rate per wavelength that is less than the maximum baud rate per wavelength: configuring the optical transmitters and the optical receivers to only transmit and receive the legacy number of wavelengths at the legacy baud rate to achieve backward communication compatibility to the legacy optical module. The configuring includes (i) turning ON a first subset, and turning OFF a second subset, of the optical transmitters and receivers such that that the first subset of optical transmitters and receivers transmit and receive the legacy number of wavelengths on the first and second optical fibers, (ii) clocking the first subset of optical transmitters and receivers at a clock frequency that causes the first subset of optical transmitters and receivers to each operate at the legacy baud rate.

Embodiments presented herein advantageously provide a network designer with the capability of performing a step-by-step upgrade of optical interconnects/links from 100 Gbps to 400 Gbps. For example, initially, a first optical module (e.g., 102(1)) with 400 Gbps capability and a legacy optical module are connected to each other over an optical link. The first optical module is configured to operate in the legacy mode (e.g., at 100 Gbps) for backward compatibility with the legacy optical module. Then, the legacy optical module is replaced with a second optical module (e.g., 102(2)) with 400 Gbps capability, i.e., the second optical module is connected to the first optical module instead of the legacy optical module. The first and second optical modules are each configured to operate in the normal mode to establish a 400 Gbps optical link.

Figure 6:
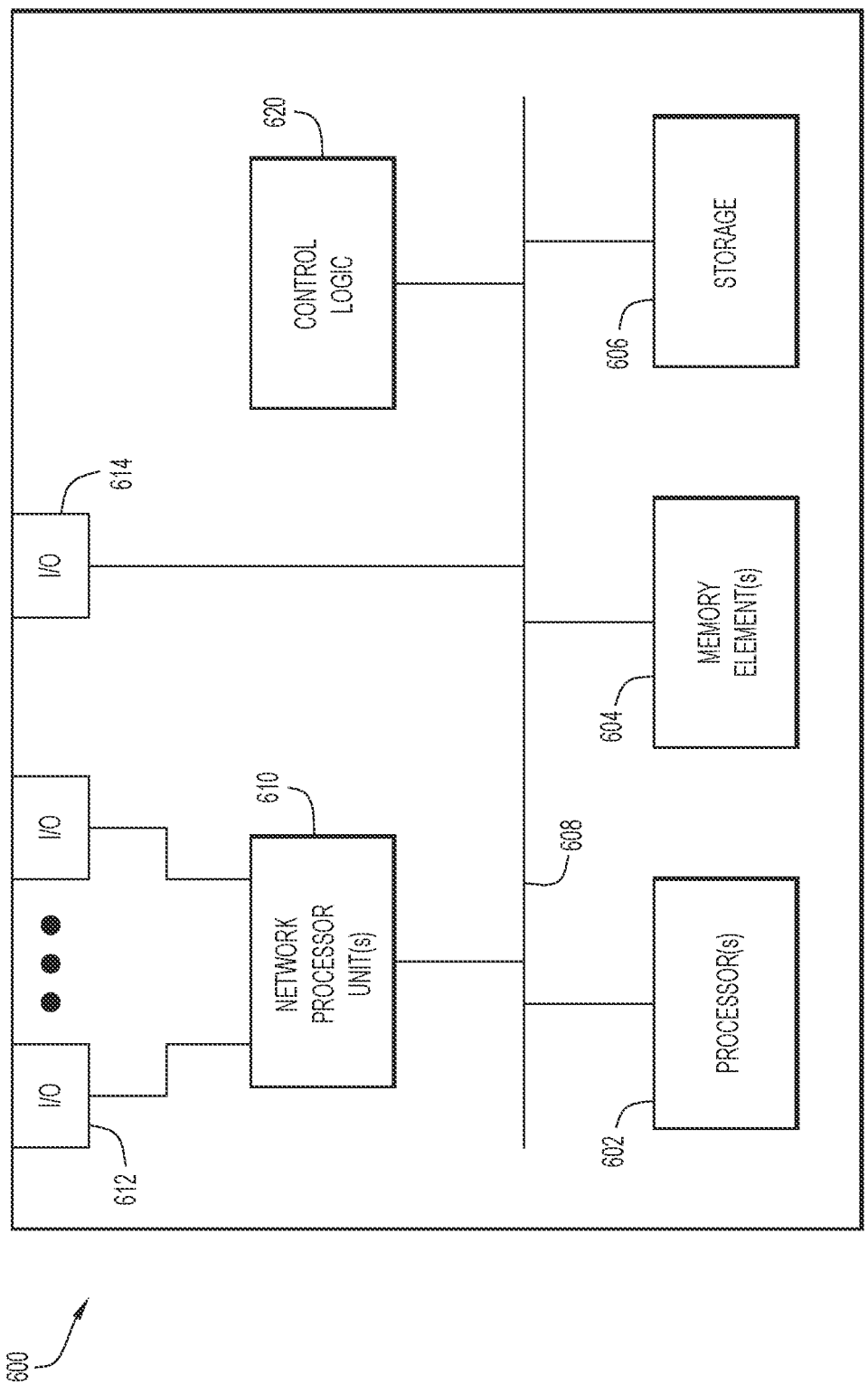
FIG. 6 is a hardware block diagram of a computer device representative with which the optical module may be integrated, according to an example embodiment.

FIG. 6 is an illustration of a hardware block diagram of a computing device 600 that may perform functions associated with operations discussed herein in connection with the techniques depicted in FIGS. 1-5. In various embodiments, a computing device or apparatus, such as computing device 600 or any combination of computing devices 600, may be configured as any entity/entities as discussed for the techniques depicted in connection with FIGS. 1-5 in order to perform operations of the various techniques discussed herein. Various components of optical module 102(1) shown in FIG. 4 may be integrated with computing device 600. For example, controller 406 of optical module 102(1) may include a combination of components of computing device 600 described below. Moreover, interface components of computing device 600 may include the optical modules described above, and may be coupled to optical fibers, for example.

In at least one embodiment, the computing device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface/line cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computer device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In summary, in one form, a method is provided comprising: at controller of an optical module including optical transmitters and optical receivers coupled to the controller and coupled to a first optical fiber and a second optical fiber: responsive to a first command, first configuring the optical module to operate in a normal mode in which the optical module operates at a maximum communication capacity by transmitting and receiving a maximum number of wavelengths, that the optical module is capable of transmitting and receiving, on the first optical fiber and the second optical fiber; and responsive to a second command, second configuring the optical module to operate in a backward compatible legacy mode in which the optical module operates at a reduced communication capacity compatible with a legacy optical module by transmitting and receiving a reduced number of wavelengths, that is less than the maximum number of wavelengths, on the first optical fiber and the second optical fiber.

In another form, an apparatus including an optical module is provided comprising: optical transmitters and optical receivers coupled to a first optical fiber and a second optical fiber; and a processor coupled to the optical transmitters and the optical receivers and configured to perform: responsive to a first command, first configuring the optical module to operate in a normal mode in which the optical module operates at a maximum communication capacity by transmitting and receiving a maximum number of wavelengths, that the optical module is capable of transmitting and receiving, on the first optical fiber and the second optical fiber; and responsive to a second command, second configuring the optical module to operate in a backward compatible legacy mode in which the optical module operates at a reduced communication capacity compatible with a legacy optical module by transmitting and receiving a reduced number of wavelengths, that is less than the maximum number of wavelengths, on the first optical fiber and the second optical fiber.

In yet another form, a non-transitory computer readable medium is provided. The computer readable medium is encoded with instruction that, when executed by a controller of an optical module including optical transmitters and optical receivers coupled to the controller and that are coupled to a first optical fiber and a second optical fiber, cause the controller to perform: responsive to a first command, first configuring the optical module to operate in a normal mode in which the optical module operates at a maximum communication capacity by transmitting and receiving a maximum number of wavelengths, that the optical module is capable of transmitting and receiving, on the first optical fiber and the second optical fiber; and responsive to a second command, second configuring the optical module to operate in a backward compatible legacy mode in which the optical module operates at a reduced communication capacity compatible with a legacy optical module by transmitting and receiving a reduced number of wavelengths, that is less than the maximum number of wavelengths, on the first optical fiber and the second optical fiber.

The above description is intended by way of example only. Various modifications and structural changes may be made therein without departing from the scope of the concepts described herein and within the scope and range of equivalents of the claims.

What is claimed is:

1. A method comprising:
at controller of an optical module including optical transmitters and optical receivers coupled to the controller and coupled to a first optical fiber and a second optical fiber:
responsive to a first command, first configuring the optical module to operate in a normal mode in which the optical module operates at a maximum communication capacity by transmitting and receiving a maximum number of wavelengths that the optical module is capable of transmitting and receiving on the first optical fiber and the second optical fiber; and
responsive to a second command, second configuring the optical module to operate in a backward compatible legacy mode in which the optical module operates at a reduced communication capacity compatible with a legacy optical module by transmitting and receiving a reduced number of wavelengths, that is less than the maximum number of wavelengths, on the first optical fiber and the second optical fiber.

2. The method of claim 1, wherein:
first configuring the optical module includes activating all of the optical transmitters and the optical receivers in order to perform transmitting and receiving the maximum number of wavelengths; and
second configuring the optical module includes activating a first subset, and deactivating a second subset, of the optical transmitters and the optical receivers in order to perform transmitting and receiving the reduced number of wavelengths.

3. The method of claim 2, wherein:
first configuring the optical module further includes configuring the optical transmitters and the optical receivers to each operate at a normal baud rate; and
second configuring the optical module further includes configuring the first subset of the optical transmitters and the optical receivers to operate at a legacy baud rate that is less than the normal baud rate.

4. The method of claim 1, wherein transmitting and receiving the maximum number of wavelengths includes:
transmitting a first wavelength and a second wavelength on the first optical fiber;
receiving a third wavelength and a fourth wavelength on the first optical fiber;
transmitting the third wavelength and the fourth wavelength on the second optical fiber; and
receiving the first wavelength and the second wavelength on the second optical fiber.

5. The method of claim 4, wherein:
the second wavelength and the third wavelength are each less than 900 nanometers (nm); and
the first wavelength and the fourth wavelength are each greater than 900 nm.

6. The method of claim 4, wherein transmitting and receiving the reduced number of wavelengths includes:
transmitting only the first wavelength on the first optical fiber;
receiving only the third wavelength on the first optical fiber;
transmitting only the third wavelength on the second optical fiber; and
receiving only the first wavelength on the second optical fiber.

7. The method of claim 4, wherein:
the second wavelength and the third wavelength are each less than 900 nanometers (nm); and
the first wavelength and the fourth wavelength are each greater than 900 nm.

8. The method of claim 1, wherein:
transmitting and receiving the maximum number of wavelengths includes using full-duplex wavelength division multiplexing; and
transmitting and receiving the reduced number of wavelengths includes using full-duplex wavelength division multiplexing.

9. An optical module comprising:
optical transmitters and optical receivers coupled to a first optical fiber and a second optical fiber; and
a processor coupled to the optical transmitters and the optical receivers and configured to perform:
responsive to a first command, first configuring the optical module to operate in a normal mode in which the optical module operates at a maximum communication capacity by transmitting and receiving a maximum number of wavelengths that the optical module is capable of transmitting and receiving on the first optical fiber and the second optical fiber; and
responsive to a second command, second configuring the optical module to operate in a backward compatible legacy mode in which the optical module operates at a reduced communication capacity compatible with a legacy optical module by transmitting and receiving a reduced number of wavelengths, that is less than the maximum number of wavelengths, on the first optical fiber and the second optical fiber.

10. The optical module of claim 9, wherein:
the processor is configured to perform first configuring the optical module by activating all of the optical transmitters and receivers in order to perform transmitting and receiving the maximum number of wavelengths; and
the processor is configured to perform second configuring the optical module by activating a first subset, and deactivating a second subset, of the optical transmitters and the optical receivers in order to perform transmitting and receiving the reduced number of wavelengths.

11. The optical module of claim 10, wherein:
the processor is further configured to perform first configuring the optical module by configuring the optical transmitters and the optical receivers to each operate at a normal baud rate; and
the processor is further configured to perform second configuring the optical module by configuring the first subset of the optical transmitters and the optical receivers to operate at a legacy baud rate that is less than the normal baud rate.

12. The optical module of claim 9, wherein transmitting and receiving the maximum number of wavelengths includes:
transmitting a first wavelength and a second wavelength on the first optical fiber;
receiving a third wavelength and a fourth wavelength on the first optical fiber;

transmitting the third wavelength and the fourth wavelength on the second optical fiber; and receiving the first wavelength and the second wavelength on the second optical fiber.

13. The optical module of claim 12 wherein:
   the second wavelength and the third wavelength are each less than 900 nanometers (nm); and
   the first wavelength and the fourth wavelength are each greater than 900 nm.

14. The optical module of claim 12, wherein transmitting and receiving the reduced number of wavelengths includes:
   transmitting only the first wavelength on the first optical fiber;
   receiving only the third wavelength on the first optical fiber;
   transmitting only the third wavelength on the second optical fiber; and
   receiving only the first wavelength on the second optical fiber.

15. The optical module of claim 12, wherein:
   the second wavelength and the third wavelength are each less than 900 nanometers (nm); and
   the first wavelength and the fourth wavelength are each greater than 900 nm.

16. The optical module of claim 9, wherein:
   transmitting and receiving the maximum number of wavelengths includes using full-duplex wavelength division multiplexing; and
   transmitting and receiving the reduced number of wavelengths includes using full-duplex wavelength division multiplexing.

17. The optical module of claim 9, wherein the optical transmitters each includes a direct modulated vertical cavity surface emitting laser (VCSEL).

18. A non-transitory computer readable medium encoded with instructions that when executed by a controller of an optical module including optical transmitters and optical receivers coupled to the controller and that are coupled to a first optical fiber and a second optical fiber, cause the controller to perform:
   responsive to a first command, first configuring the optical module to operate in a normal mode in which the optical module operates at a maximum communication capacity by transmitting and receiving a maximum number of wavelengths that the optical module is capable of transmitting and receiving on the first optical fiber and the second optical fiber; and
   responsive to a second command, second configuring the optical module to operate in a backward compatible legacy mode in which the optical module operates at a reduced communication capacity compatible with a legacy optical module by transmitting and receiving a reduced number of wavelengths, that is less than the maximum number of wavelengths, on the first optical fiber and the second optical fiber.

19. The non-transitory computer readable medium of claim 18, wherein:
   the instructions to cause the controller to perform first configuring the optical module include instructions to cause the controller to perform activating all of the optical transmitters and the optical receivers in order to perform transmitting and receiving the maximum number of wavelengths; and
   the instructions to cause the controller to perform second configuring the optical module include instructions to cause the controller to perform activating a first subset, and deactivating a second subset, of the optical transmitters and the optical receivers in order to perform transmitting and receiving the reduced number of wavelengths.

20. The non-transitory computer readable medium of claim 19, wherein:
   the instructions to cause the controller to perform first configuring the optical module further include instructions to cause the controller to perform configuring the optical transmitters and the optical receivers to each operate at a normal baud rate; and
   the instructions to cause the controller to perform second configuring the optical module further include instructions to cause the controller to perform configuring the first subset of the optical transmitters and the optical receivers to operate at a legacy baud rate that is less than the normal baud rate.

* * * * *